United States Patent [19]

Busboom et al.

[11] Patent Number: 4,662,812

[45] Date of Patent: May 5, 1987

[54] BIN UNLOADER WITH OBLIQUE PIVOT AXIS

[75] Inventors: Garry W. Busboom, Independence, Mo.; Randall E. Breyer, Lorena, Tex.

[73] Assignee: Deutz-Allis Corporation, Milwaukee, Wis.

[21] Appl. No.: 799,743

[22] Filed: Nov. 19, 1985

[51] Int. Cl.[4] .............................................. B60P 1/00
[52] U.S. Cl. .................... 414/523; 198/668; 414/505; 414/526
[58] Field of Search ............... 414/523, 526, 503, 504, 414/505; 198/313, 587, 589, 668; 56/473.5

[56] References Cited

U.S. PATENT DOCUMENTS

| 1,689,963 | 10/1928 | Pelton ............................ 198/668 |
| 3,638,812 | 2/1972 | Ryczek . |
| 3,670,913 | 6/1972 | Reaves ........................... 414/523 X |
| 4,093,087 | 6/1978 | DeCoene . |
| 4,218,169 | 8/1980 | Arends ............................. 414/253 |
| 4,459,079 | 7/1984 | Brelsford et al. .............. 414/523 X |

Primary Examiner—Frank E. Werner
Attorney, Agent, or Firm—Charles L. Schwab

[57] ABSTRACT

An agricultural harvester has a grain bin with an oblique side wall section at one lateral side of the grain bin presenting a discharge opening, an unloading tube with an end portion pivotally mounted on the oblique side wall section for swinging movement about the axis of the discharge opening, and a linear hydraulic actuator and support structure therefor disposed in a pocket in the one lateral side of the grain bin. The cylinder and piston components of the actuator are pivotally connected, respectively, to the support structure and the unloading tube. A grain bin auger is disposed in the bottom of the grain bin, an unloading auger is disposed in the unloading tube and an inclined intermediate auger has its opposite ends connected to ends of the grain bin auger and the unloading tube auger by universal joints. An alignment adjustment joint is provided in the unloading tube to permit offsetting the effect of tolerance buildup occurring in manufacture of the unloading tube and its support structure.

9 Claims, 8 Drawing Figures

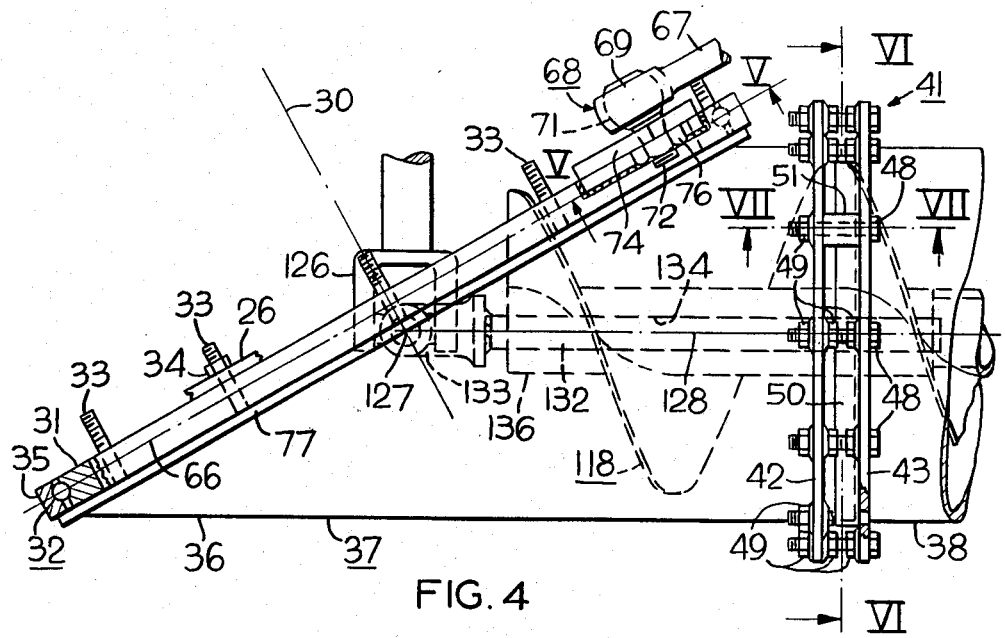
FIG. 4
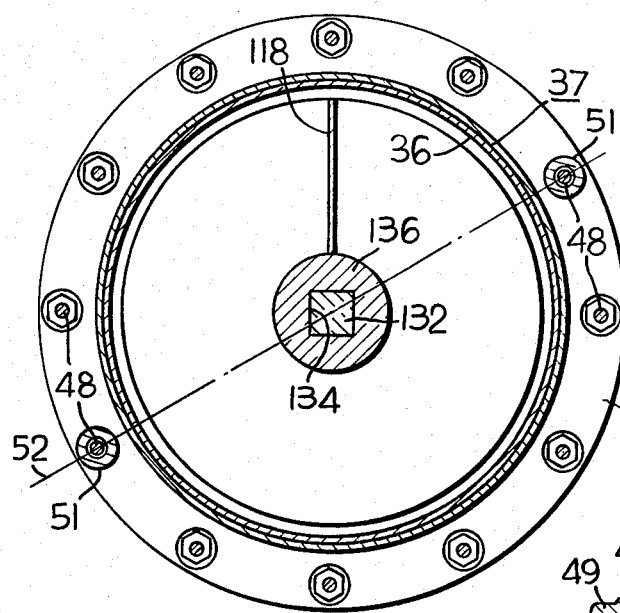
FIG. 6
FIG. 5
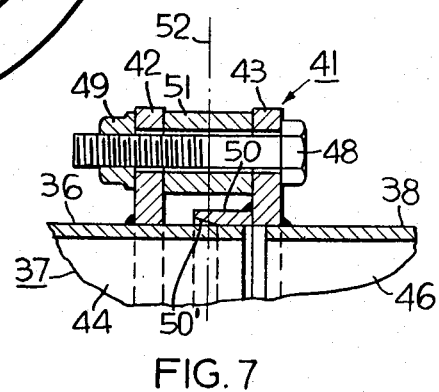
FIG. 7

4,662,812

BIN UNLOADER WITH OBLIQUE PIVOT AXIS

This invention relates to a grain bin unloader for an agricultural harvester and more particularly to a mounting or swivel arrangement for the unloading tube which permits it to pivot between transport and grain unloading positions.

OBJECTS AND SUMMARY OF THE INVENTION

It is an object of the present invention to provide an improved grain bin unloader for an agricultural harvester wherein the unloading tube is pivotally connected to one lateral side of the grain bin on an oblique pivot axis.

It is a further object of the invention to provide a grain bin unloader as hereinbefore outlined wherein an inclined intermediate auger interconnects a horizontal auger in the bottom of the grain bin and an auger in the unloading tube and said intermediate auger does not change its angular relationship with the horizontal auger during pivotal movement of the unloading tube between a horizontal transport position and an upward and outward disposed unloading position.

It is a further object of this invention to provide a combined grain bin and unloading tube arrangement wherein a linear actuator for pivoting the unloading tube is disposed in a pocket in the side of the grain bin.

It is a further object of this invention to provide a grain bin unloading tube for an agricultural harvester which includes an adjustment joint near its swivel connection with the grain bin which permits changing the alignment of a major part of the unloading tube to properly position the tube in its transport position alongside the harvester.

This invention may be summarized as a harvester construction in which one lateral side of a grain bin includes an oblique side wall section presenting a discharge opening facing downwardly and outwardly in a rearward direction. The part of the side wall section presenting the discharge opening inclines relative to a horizontal plane so as to extend upwardly in an outward direction and inclines relative to a vertical fore and aft plane so as to extend inward in a rearward direction. A receiving end of an unloading tube is pivotally mounted on the grain bin for pivotal movement about a pivot axis extending through the discharge opening whereby the unloading tube may be swung between a horizontal transport position alongside the harvester to an unloading position in which the unloading tube extends laterally upward and outward from the grain bin. The grain bin includes a bottom section having a horizontal trough portion and an inclined trough portion sloping upward and outwardly from the horizontal trough portion. A horizontal grain bin auger in the horizontal portion of the grain bin bottom section is connected to one end of an intermediate auger in the inclined portion by a first universal joint and the unloading tube auger is connected to the other end of the intermediate auger by a second universal joint disposed at the discharge opening in the oblique side wall section. A hydraulic actuator for swinging the unloader tube between transport and unloading positions may be located in a pocket in the grain bin and the support structure for the actuator may be integral with the oblique side wall section. An adjustment joint may be provided in the unloading tube near its receiving end which permits the tube to be angularly adjusted.

BRIEF DESCRIPTION OF THE DRAWINGS

One embodiment of the invention is illustrated in the drawings in which:

FIG. 4 is a view of part of the unloading tube and parts connected thereto;

FIG. 5 is a view taken along line V—V in FIG. 4;

FIG. 6 is a view taken along the line VI—VI in FIG. 4;

FIG. 7 is a view taken along the line VII—VII in FIG. 4; and

DETAILED DESCRIPTION OF THE DRAWINGS

Figure 1:
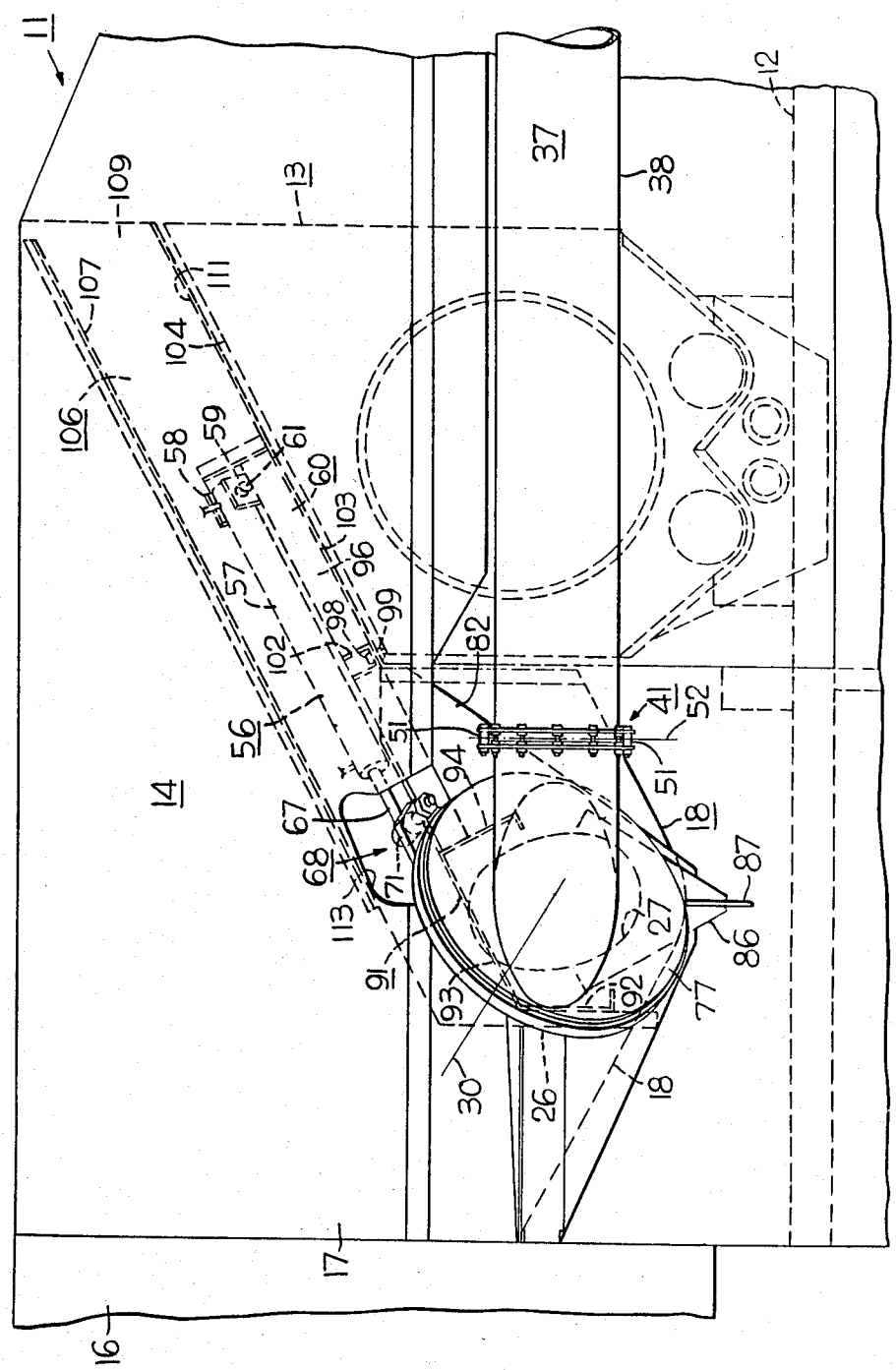
FIG. 1 is a partial left-hand side view of a harvester with an unloading tube in a horizontal transport position.
Figures 2, 8:
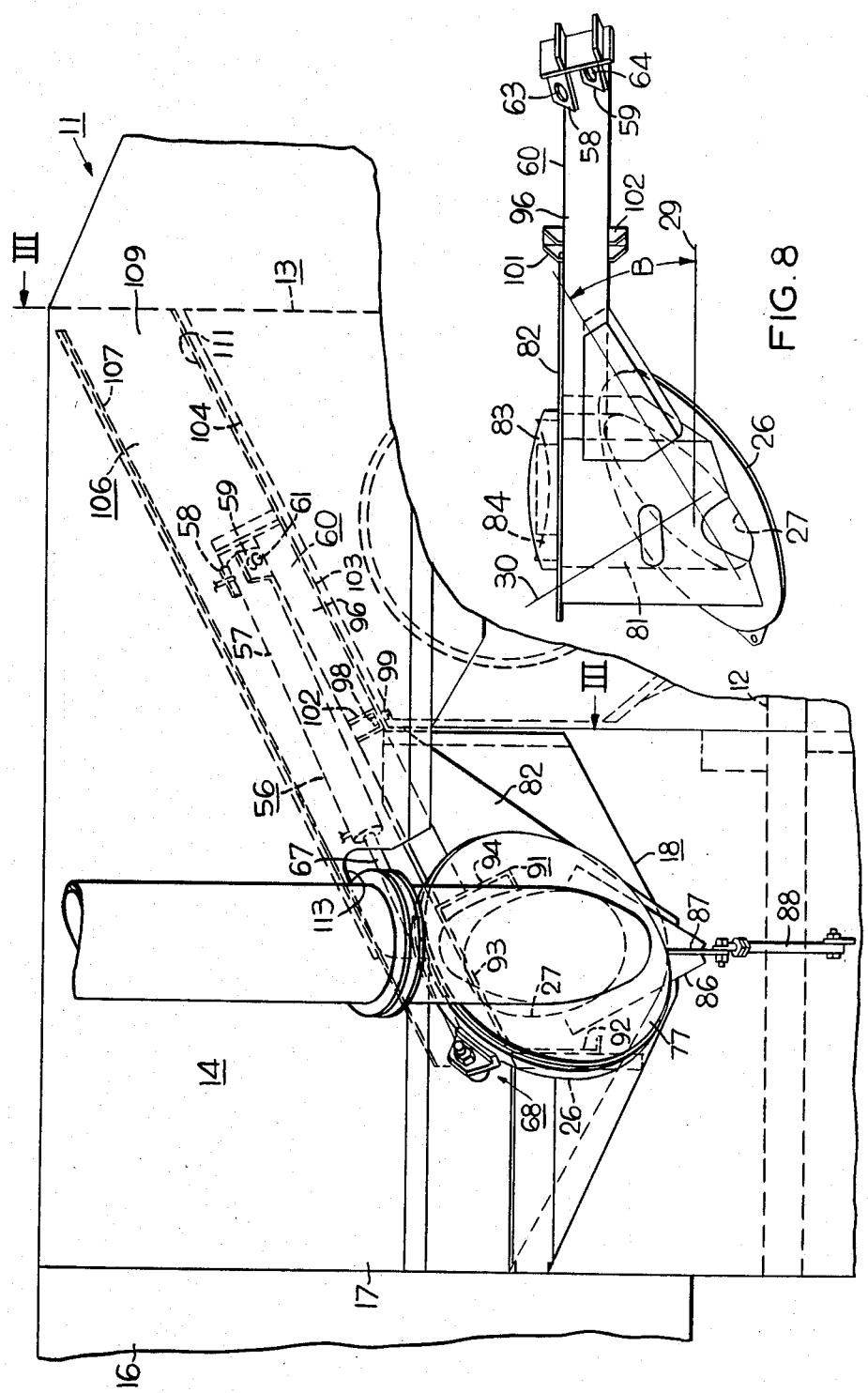
FIG. 2 is a view similar to FIG. 1 with the unloading tube in its grain unloading position.
FIG. 8 is a top view of an integral support structure for the unloading tube and a hydraulic actuator.
Figure 3:
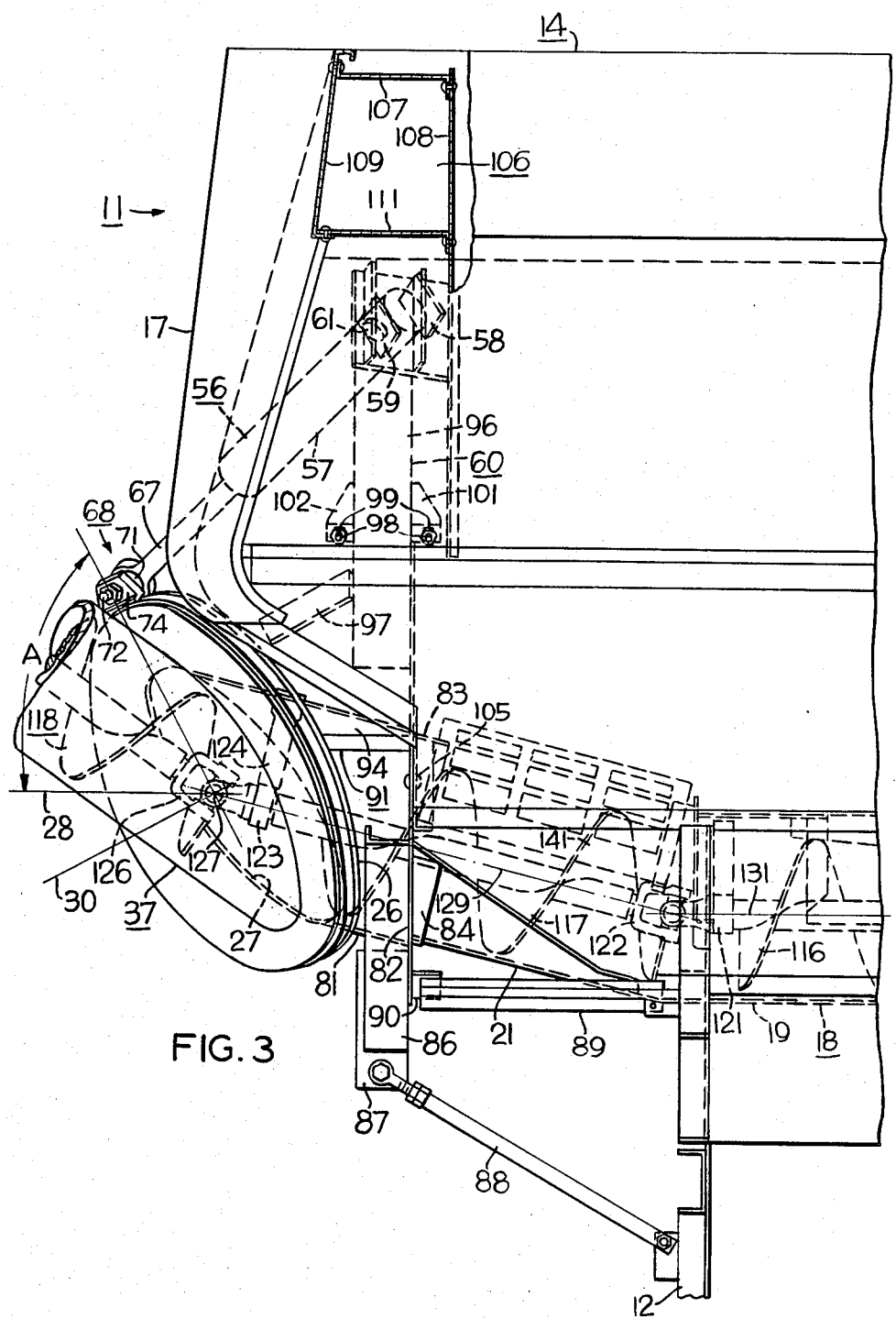
FIG. 3 is a partial rear view of the structure shown in FIG. 2 with parts broken away for illustration purposes.

Referring to FIGS. 1 through 3, a harvester in the form of a self-propelled combine 11 includes a main frame 12 supporting a crop processor 13, a grain bin 14 and an operator's cab 16 in front of the grain bin. The grain bin 14 includes a lateral side or side wall 17 at the left-hand side of the combine and a bottom wall section 18 which includes a horizontal trough portion 19 and an inclined trough portion 21 which extends upwardly and outwardly from the discharge end of the trough portion 19.

Referring also to FIG. 8, there is illustrated a combined unloading tube and hydraulic actuator support 60 which includes a plate or oblique side wall section 26 of the side wall 17 of the grain bin. The oblique side wall section 26 constitutes a flat annular end plate in which an oval shaped discharge opening 27 is formed. As shown in FIG. 3, the oblique side wall section 26 is inclined at an angle A to a horizontal plane 28 so as to extend upwardly in an outward direction and, as shown in FIG. 8, the oblique side wall section 26 is inclined at an angle B to a fore and aft vertical plane 29 so as to extend inwardly of the harvester in a rearward direction whereby the discharge opening 27 faces downwardly and outwardly in a rearward direction.

As shown in FIG. 4, the oblique side wall section 26 is secured to an inner raceway 31 of a roller or ball bearing 32 by threaded studs 33 on the inner raceway 31 extending through appropriate openings in the side wall section 26 and by nuts 34. The outer raceway 35 of the bearing 32 is secured to a short tube portion 36 of an unloading tube 37 at the latter's receiving end. As shown in FIGS. 4, 6 and 7, the short tube portion 36 of the unloading tube 37 is connected to a long tube portion 38 by an adjustable connector joint 41. The connector joint 41 includes a pair of axially spaced and radially outward extending annular flanges 42, 43 welded to end parts 44, 46 of tube portions 36, 38 which are adjustably connected by adjustable fastening means in the form of bolts 48 and nuts 49. A pilot collar 50 is welded to the flange 43 and includes a conical surface 50' at the outer end of its interior bore which, during assembly, serves to pilot the tube portion 36 into a telescopic fit with the collar 50. Thereafter, the collar 50 maintains alignment between the end parts 44, 46. The bolts 48 extend through aligned openings in the flanges and are equally spaced circumferentially about the tube 37. A pair of tubular spacers 51 are placed between the flanges 42, 43 at diametrically opposite sides of the tube 37 and diametrically opposite bolts 48 pass through the spacers 51. By adjusting the position of the nuts 49 on the bolts 48, other than the bolts passing through the spacers 51, the long tube portion 38 can be pivoted relative to the short tube portion 36 about an axis 52 through the spacers 51. In the transport position of the unloading tube 37, as shown in FIG. 1, the axis 52 of the connector joint lies in a vertical fore and aft plane. The adjustable connector joint 41 permits changes in the orientation of the long tube portion 38 relative to the short tube portion 36, allowing the long tube portion 38, in its transport position, to be shifted laterally in or out relative to the side of the harvester. It is desirable to have the unloading tube 37 as close as possible to the harvester in its transport position so as to minimize overall width of the harvester. However, a buildup of tolerances in manufacture may cause the unloading tube to contact the side of the harvester. The connector joint 41 permits the long tube portion 38 to be adjusted so as to avoid such contact.

The unloading tube 37 is pivoted about the axis 30 of the bearing 32 by a linear actuator in the form of a double acting hydraulic ram or motor 56 having relatively extendable and retractable components in the form of a piston and a cylinder 57. The pivot axis 30 is perpendicular to the oblique side wall section 26. The cylinder 57 is pivotally connected to flanges 58, 59 on a support structure 60 for the actuator 56 and the unloading tube 37 by a pair of aligned pins 61, only one of which is shown. The cylinder support pins 61 fit in aligned cylindrical openings 63, 64 in the flanges 58, 59, as shown in FIG. 8, and lie on an axis perpendicular to the plane 66 of the bearing 32, shown in FIG. 4. The piston of the actuator includes a rod part 67 pivotally connected to the unloading tube 37 by a ball and socket joint 68 which includes a socket 69 on the end of the rod part 67 and a ball 71. The ball 71 includes a tapered threaded stud 72 held in a conical opening in a bracket 74 by a nut 76. As shown in FIG. 5, the bracket 74 is welded to the outer raceway 35 of the bearing 32 which in turn is welded to a flat annular plate 77 on the receiving end of the short portion 36 of the unloading tube 37.

As shown in FIG. 8, the rigid integral support structure 60 for supporting the unloading tube and the actuator 56 includes a cylindrical part 81 which is welded at its opposite ends to the annular plate or oblique wall section 26 and to a vertical plate 82. Upper and lower curved retainers 83, 84 are welded to the inner side of the vertical plate 82 and, as shown in FIG. 3, the outer end of the inclined trough 21 lies on top of the lower retainer 84. The cylindrical part 81 is a continuation of and is in effect a part of the inclined trough 21. The support structure 60 includes a V-shaped reinforcing cradle 86 which is welded to the cylindrical part 81 and includes a bracket 87 which is braced relative to the combine main frame 12 by an adjustable strut 88 interconnected therebetween. The support structure 60 is also reinforced by a horizontal brace 89 having its opposite ends secured, respectively, to the main frame 12 and a bracket 90 welded to the inner side of plate 82. A transversely extending bracket 91 with walls 92, 93, 94 extends between and is welded to the oblique annular plate 26 and to the vertical plate 82. An upwardly and rearwardly extending hollow support beam 96 of the support structure 60 is welded at its front end to the bracket 91 and is also welded to the vertical plate 82. A gusset 97 welded to the bracket 91 and to the beam 96 further enhances the strength and rigidity of the support structure 60. The support structure 60 is secured to the frame 12 of the combine 11 by appropriate fastening means including bolts 98 and nuts 99 securing brackets 101, 102 of the support beam 96 to a frame member 103 constituting part of the frame for the housing 104 for the processor 13 of the combine. The vertical plate 82 is also rigidly secured to the frame 12 and grain bin 14 of the combine by suitable fastening means, such as rivet 105.

In order to accommodate the hydraulic actuator 56 and the beam 96 supporting it, a pocket 106 is provided in the left-hand lateral side of the combine by an upwardly and rearwardly sloping upper wall 107, an inwardly spaced vertical side wall 108, an outwardly spaced side wall 109 and an upwardly and rearwardly sloping bottom wall 111. The upper wall 107 and the side wall 108 are wall portions of the grain bin 14. The outer wall 109 of the pocket 106 is a rearward and downward continuation of the lateral side wall 17 of the grain bin 14. Thus, the hydraulic actuator is recessed into the pocket 106 in the lateral side of the grain bin 14 so the axis of the cylinder mounting pins 61 is parallel to the unloading tube swing or pivot axis 30. This places the actuator 56 in a hidden position where it does not detract from the appearance of the combine. The rod 67 of the piston extends and retracts through a side wall opening 113 in the side wall 109 of the pocket 106 and is connected to the unloading tube 37 near its swivel connection with the grain bin 14 by the bearing 32.

Grain is conveyed from the grain bin 14 by a series of interconnected augers including a horizontal grain bin auger 116 in the bottom trough 19 of the grain bin, an inclined intermediate auger 117 in the inclined trough 21 and an unloading tube auger 118 operatively positioned in the unloading tube 37. The discharge end of the horizontal grain bin auger 116 is supported by a bearing 121 mounted on the grain bin 14 and it is universally connected to the receiving end of the intermediate auger 117 by a universal joint 122. The discharge end of the intermediate auger 117 is supported by a bearing 123 mounted on a bracket 124 secured to the tube part 81 of the support structure 60 and it is universally connected to the receiving end of the unloading tube auger 118 by a universal joint 126. As shown in FIG. 4, the pivot point 127 of the universal joint 126 is at the junction of the axis 30 of the bearing 32 and the axis 128 of the unloading tube 37 and its auger 118. The pivot point 127 is also near the plane 66 of the bearing 32. This construction permits the axis 129 of the intermediate auger to remain in a fixed angular relationship to the axis 131 of the grain bin auger 116. As shown in FIGS. 4 and 6, a square section shaft part 132 on the clevis part 133 of the universal joint 126 slidingly fits in a complementary square section opening 134 extending axially into the receiving end of the auger shaft 136 thus constituting a slip joint permitting relative axial movement between the clevis part 133 and the shaft 136 of the auger 118. The slip joint compensates for any longitudinal tolerance buildup in construction of the unloading tube 37.

The herein described construction provides a unique support structure 60 for an unloading tube and its operating actuator 56. The pocket 106 extends upwardly and rearwardly from the unloading tube swivel joint or bearing 32 and is recessed into the lateral side of the grain bin thereby permitting the actuator to be connected directly to the unloading tube near the plane 66 of the bearing 32 and places the actuator in a protected location where it does not detract from the appearance of the combine. Placing the pivot point 127 on the axis 30 of the bearing 32 near its plane 66 allows the intermediate auger 117 to be supported on a fixed axis. Thus, the auger flight 141 will have a fixed clearance with the trough 21 which contributes to its efficient movement of grain from the grain bin to the receiving end of the unloading tube auger 118. The adjustable connector joint 41 permits the long portion 38 of the unloader tube 37 to be angularly adjusted relative to the short portion 36 so that any detrimental buildup of tolerances can be offset to avoid undesired contact by the unloading tube with the lateral side of the combine when the latter is placed in its horizontal longitudinal transport position shown in FIG. 1.

The embodiments of the invention in which an exclusive property or privilege is claimed are defined as follows:

1. A harvester comprising:
 a grain bin having an oblique side wall section at one of its lateral sides presenting a discharge opening and a bottom section with a horizontal trough portion and an inclined trough portion which slopes upwardly and outwardly from the horizontal trough portion to the discharge opening of said side wall section, said oblique side wall section being inclined at a first angle to a horizontal plane so as to extend upwardly in an outward direction and at a second angle to a vertical fore and aft plane so as to extend inwardly of the harvester in a rearward direction whereby said discharge opening faces downwardly and outwardly in a rearward direction,
 a substantially uniform section cylindrical unloading tube having a receiving end and a discharge end,
 means pivotally mounting said receiving end of said unloading tube on said grain bin for swinging movement of said tube about a pivot axis extending through said discharge opening and perpendicular to said oblique side wall section, said tube being swingable about said pivot axis between a substantially longitudinal and horizontal transport position alongside the harvester to a grain unloading position in which said tube extends laterally from the grain bin in an upward and outward direction,
 an unloading auger in said unloading tube having a receiving end at said discharge opening,
 a grain bin auger in said horizontal trough portion of said grain bin bottom section having a discharge end spaced from said discharge opening,
 an intermediate auger of fixed length disposed in said inclined trough portion of said grain bin bottom section and extending from said discharge end of said grain bin auger to said receiving end of said unloading auger,
 a first universal joint connecting the discharge end of said grain bin auger to one end of said intermediate auger, and
 a second universal joint connecting the other end of said intermediate auger to said receiving end of said unloading auger, the pivot point of said second universal joint lying substantially in the plane of said discharge opening and on said pivot axis, said universal joints drivingly interconnecting said augers in said unloading and transport positions of said tube.

2. The harvester of claim 1 and further comprising wall means in said grain bin at said one lateral side thereof defining a pocket recessed into said one lateral side of said grain bin, a hydraulic actuator disposed in said pocket and having relatively extendable and retractable piston and cylinder components, means pivotally connecting one of said components to said harvester and means pivotally connecting the other of said components to said unloading tube in spaced relation to said pivot axis, said actuator being operable to effect swinging movement of said unloading tube about said pivot axis between its transport position to its grain unloading position.

3. The harvester of claim 1 and further comprising
 an extendable and retractable hydraulic actuator aligned substantially with a plane normal to said pivot axis and having cylinder and piston components,
 means pivotally connecting one of said components of said actuator to said unloading tube,
 wall means in said one lateral side of said grain bin defining a pocket recessed into said one lateral side and
 a rigid support structure pivotally supporting the other of said components of said actuator, said rigid support structure being integral with said oblique side wall section and disposed within said pocket.

4. The harvester of claim 1 wherein said receiving end of said unloading tube is pivotally connected to said oblique side wall section by a roller bearing and said pivot point of said second universal joint lies substantially in the plane of said roller bearing.

5. The harvester of claim 1 wherein said intermediate auger maintains the same angular relationship with said grain bin auger regardless of the pivoted positon of said unloading tube.

6. The harvester of claim 5 and further comprising a bearing on said one lateral side of said grain bin rotatably supporting said other end of said intermediate auger laterally inward of said second universal joint.

7. A harvester comprising:
 a grain bin having an oblique side wall section at one of its lateral sides presenting a discharge opening and a bottom section with a horizontal trough portion and an inclined trough portion which slopes upwardly and outwardly from the horizontal trough portion to the discharge opening of said side wall section, said oblique side wall section being inclined at a first angle to a horizontal plane so as to extend upwardly in an outward direction and at a second angle to a vertical fore and aft plane so as to extend inwardly of the harvester in a rearward direction whereby said discharge opening faces downwardly and outwardly in a rearward direction, a grain bin auger in said horizontal trough and an intermediate auger in said inclined trough portion universally connected to said grain bin auger and an unloading tube having a receiving end and a discharge end and including an auger therein universally connected to said intermediate auger at a pivot point lying substantially in the plane of said discharge opening, said receiving end being pivotally mounted on said grain bin for swinging movement of said tube about a pivot axis through said discharge opening between a substantially longitudinal and horizontal transport position alongside the harvester to a grain unloading position in which said tube extends laterally from the grain bin in an upward and outward direction, said unloading tube having a first tube portion of relatively short length including said receiving end of said tube and a second tube portion of relative great length including said discharge end of said tube, said first and second tube portions of said tube presenting adjacent end parts relatively near said receiving end of said tube and an adjustment joint interconnecting said end parts permitting the direction of said second tube portion to be changed relative to said first thbe portion, said adjustment joint including a pair of axially spaced annular flanges secured to and extending radially outward, respectively, from said adjacent end parts of said first and second tube portions and fastening means adjustably interconnecting said flanges in fixed positions relative to one another and operable to change the orientation of said second tube portion relative to said first tube portion.

8. The harvester of claim 7 and further comprising wall means in said grain bin at said one lateral side thereof defining a pocket recessed into said one lateral side of said grain bin, a hydraulic actuator disposed in said pocket and having relatively extendable and retractable piston and cylinder components, means pivotally connecting one of said components to said harvester and means pivotally connecting the other of said components to said unloading tube in spaced relation to said pivot axis, said actuator being operable to effect swinging movement of said unloading tube about said pivot axis between its transport position to its grain unloading position.

9. The harvester of claim 7 wherein said means adjustably interconnecting said flanges includes
- a pair of spacers between said flanges and disposed at diametrically opposite sides of said tube and
- a plurality of releasable and adjustable fastening means adjustably securing said flanges to one another at circumferentially spaced points about said tube, adjustment of said adjustable fastening means effecting pivotal movement of said second tube portion relative to said first tube portion about an axis through said pair of spacers.

* * * * *